Aug. 5, 1958

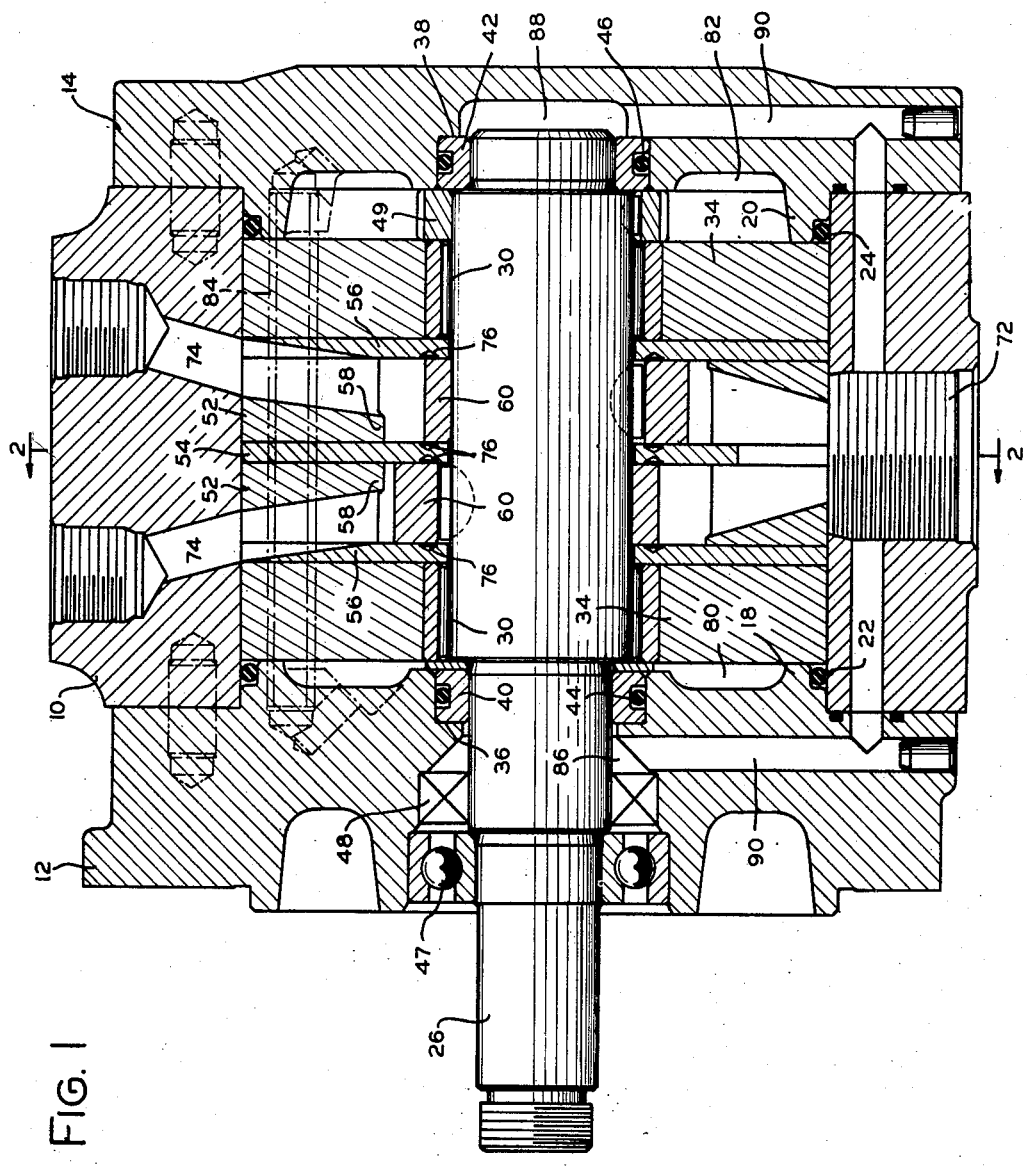

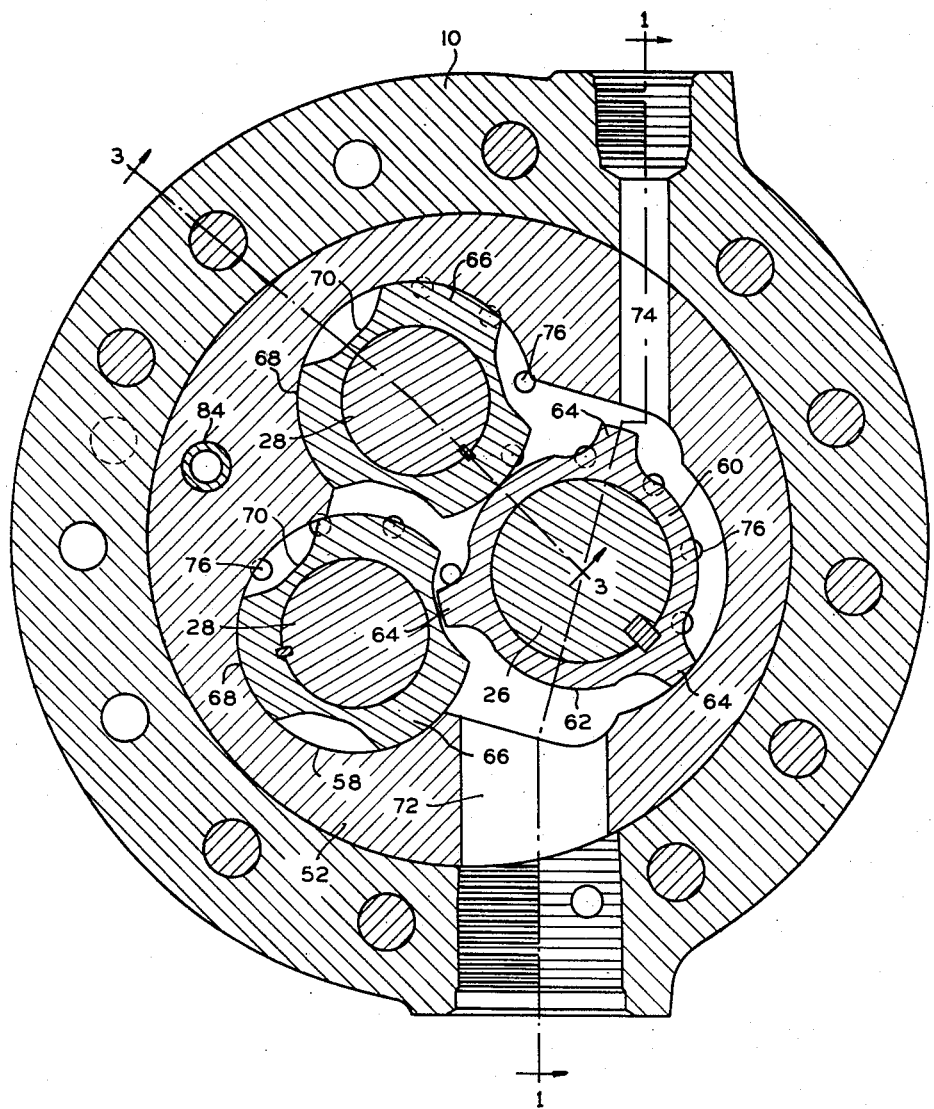

R. LAPSLEY 2,845,873

ROTATING FLUID PUMP

Filed Sept. 8, 1954

INVENTOR.
ROBERT LAPSLEY
BY
ATTY.

United States Patent Office 2,845,873
Patented Aug. 5, 1958

2,845,873

ROTATING FLUID PUMP

Robert Lapsley, Buchanan, Mich., assignor to Clark Equipment Company, Berrien Springs, Mich., a corporation of Michigan Application September 8, 1954, Serial No. 454,673

16 Claims. (Cl. 103—125)

My present invention relates generally to a rotating fluid pump and, more particularly, is directed to an improved arrangement of the elements of such a pump including the fluid sealing means and valve index driving gears therefor.

The pump of my present invention comprises a generally tubular casing in which are arranged a plurality of fluid cylinder defining elements maintained in assembled relation by means of cover members secured to the ends of the casing. An input shaft extends through the discs and one of the cover members and is adapted to be power rotated. Driven by the input shaft within at least one cylinder defined by the cylinder elements are fluid pressure developing elements which serve to increase the pressure of the fluid flowing from the inlet to the outlet fluid passageway means communicating with the cylinder.

It is an object of my present invention to provide a pump as described wherein the pressure of the fluid developed by the pump may be utilized for urging the cylinder elements toward each other whereby to maintain the efficiency of the pump at a maximum.

To accomplish this object I provide fluid seal members about the input shaft within the end cover members and form chambers between the cover members and the adjacent cylinder elements whereat fluid leaking from the cylinder elements may be collected. When the pump is in operation, the pressure of the fluid collected in the chambers builds up to approximately the pressure of the fluid being pumped by the fluid pressure developing elements and serves to force the cylinder elements toward each other so as to prevent the cylinder elements from being separated by the pressure of the fluid being pumped by the pressure developing elements. As a result of this arrangement maximum pump efficiency is maintained.

It is another object of my invention to provide means for equalizing the pressure of the fluid collected in the chambers at the ends of the pump. Equalization is obtained by inserting a tubular dowel member through the cylinder elements and placing the ends thereof in communication with the fluid collecting chambers for interconnecting the latter.

It is still another object of my invention to provide means for accommodating fluid leaking from the above described chambers past the input shaft seals. In my present invention, the slight amount of fluid which leaks from the fluid collecting chambers past the input shaft seals is collected in auxiliary chambers formed outwardly of the seals and conveyed back to the inlet fluid passageway means through auxiliary fluid passageways.

A further object of my present invention resides in the provision of improved side seals for the cylinder of the pump.

The above referred to cylinder elements are comprised of a plurality of discs. These discs are separated by plate members which serve as side seals for the cylinder formed in at least one of the discs. In this connection, it will be recalled that fluid pressure developing elements are arranged within the cylinder, the latter of which communicates with the inlet and outlet fluid passageway means of the pump.

In the preferred embodiment of my invention a series of four discs separated by plate members are arranged in the pump casing. Fluid cylinders are formed in the middle two discs and sets of fluid pressure developing elements are disposed in these cylinders. Each set of fluid pressure developing elements comprises an impeller and a pair of valve members.

It is a still further object of my present invention to provide a fluid pump which is capable of delivering two streams of fluid at dissimilar pressures for use in two independent fluid circuits.

I accomplish this object by forming the pump with inlet fluid passageway means common to both of the pump cylinders and a pair of outlet fluid passageway means in independent communication with the cylinders. The pressures of the fluid in the pair of outlet fluid passageway means correspond to the work being done by the fluid emitted from the respective outlet passageways.

It is a feature of my present invention that the inlet and outlet fluid passageways are substantially aligned thus providing a relatively direct path of the flow of fluid through the pump so as to maintain maximum efficiency.

It is another feature of my present invention that recesses are formed in the pump plates adjacent the impellers and valve members whereby fluid is conducted about the sides of these elements in balanced areas for lubricating the rubbing surfaces and for eliminating wear of the impellers and valve members by preventing them from being forced against one of the adjacent pump plates by fluid pressure surges.

It is still another object of my invention to provide a unique gear system whereby the fluid pressure developing elements, the axes of which are arranged at the apexes of a substantially equilateral triangle, may be rotated at identical speeds. Of the three gears used to drive the fluid pressure developing elements, the one drive gear is formed oversize and the two driven gears are formed undersize. Thus, the axes of the gears, which are formed with identical numbers of teeth, may be arranged at the apexes of a substantially equilateral triangle with the driven gears meshing with the drive gear but not with each other.

Still another feature of my invention resides in the use of pump elements having configurations that may be readily machined inexpensively to the required degree of accuracy for maximum efficiency.

Now, in order to acquaint those skilled in the art with the manner of constructing and using fluid pumps in accordance with the principles of my present invention, I shall describe in connection with the accompanying drawings a preferred embodiment of my invention.

In the drawings:

Figure 1 is a lengthwise cross-sectional view of the pump of my present invention, taken substantially along the line 1—1 of Figure 2, looking in the direction indicated by the arrows;

Figure 2 is a transverse cross-sectional view of the pump, taken substantially along the line 2—2 of Figure 1, looking in the direction indicated by the arrows;

Figure 4:
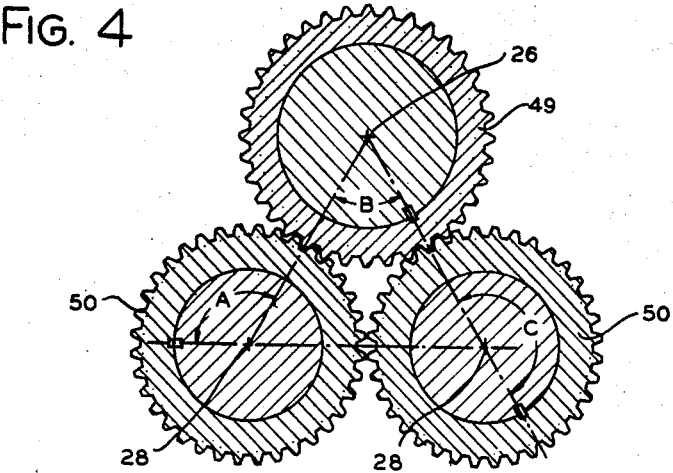
Figure 4 is an elevational view of the drive and driven gears of the pump of Figure 1.
Figure 3:
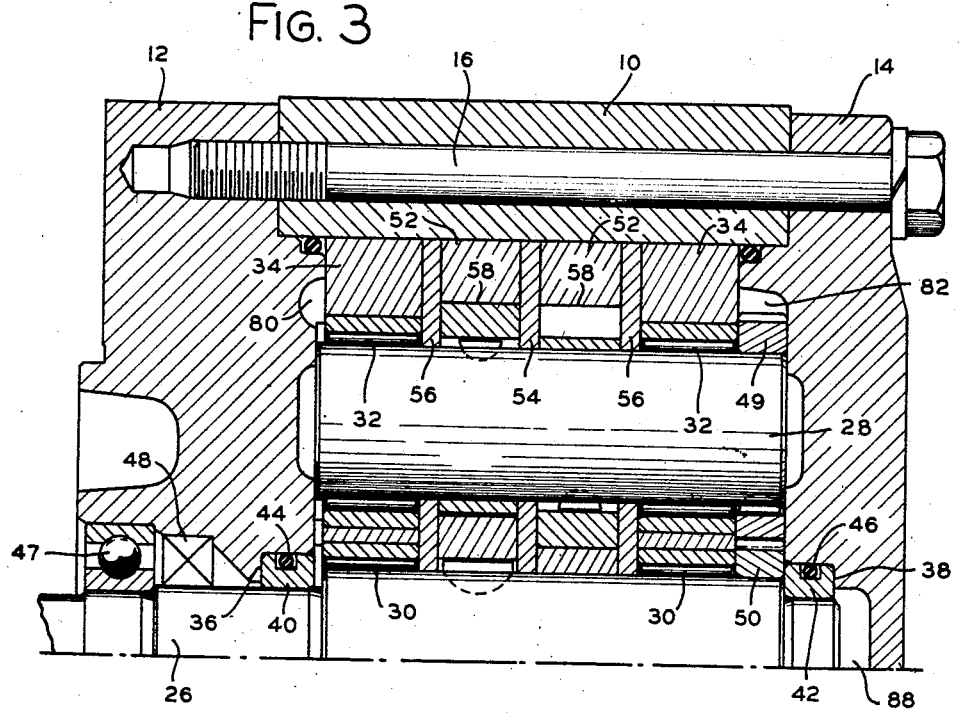
Figure 3 is a partial lengthwise cross-sectional view of the pump, taken substantially along the line 3—3 of Figure 2, looking in the direction indicated by the arrows.

Referring now to the drawings, the fluid pump of my present invention comprises a generally tubular casing or housing 10. End plates or cover members 12 and 14 are secured to the ends of the housing 10 by means of a plurality of circumferentially spaced, axially extending bolts 16 which may be arranged, for example, to be passed through the end cover 14 and the housing 10 and to be threaded into the end cover 12. The end covers 12 and 14 are formed, respectively, with annular, axially inwardly extending projections 18 and 20 which fit within the ends of the housing 10 and provide support for annular seals 22 and 24.

The fluid pump further comprises an input shaft 26 and a pair of countershafts 28 which extend parallel to the axis of the casing. The input shaft 26, which extends outwardly of the cover 12, is adapted to be driven by suitable prime mover means (not shown). The shaft 26 and countershafts 28 are respectively journaled in bearing assemblies 30 and 32. Support for the bearing assemblies 30 and 32 is provided by discs 34 which are arranged adjacent the end cover members 12 and 14. Axial bores 36 and 38 are formed in the covers 12 and 14 are loosely fitted therein about the input shaft 26 are annular pressure seal bushings 40 and 42. The bushings 40 and 42, respectively, carry, at their outer peripheries, O ring fluid seals 44 and 46 which serve to prevent fluid flow therepast. The loose fit of the bushings 40 and 42 within the covers 12 and 14 allows for any eccentricity of the shaft 26 and prevents rapid wear of those portions of the bushings which are in contact with the shaft 26. In addition, a ball bearing assembly 47 is fitted intermediate of the shaft 26 and the cover 12 and disposed inwardly of the bearing assembly 47 is a seal 48.

So as to provide for synchronous rotation at identical speeds of the shafts 26 and 28, a main timing or drive gear 49 is secured to the right-hand end of the shaft 26 intermediate of the adjacent disc 34 and cover 14, and gears 50 are secured to the right-hand ends of the countershafts 28 in meshing engagement with the gear 49. The construction and arrangement of the gears 49 and 50 will be discussed in detail hereinafter.

Arranged within the casing 10, intermediate of the discs 34, are fluid cylinder defining elements comprised of a pair of discs 52 which are separated from each other by a plate 54 and from the discs 34 by plates 56. The discs 34 and 52 and the plates 54 and 56 extend transversely of the axis of the casing and are maintained tightly in assembled relation by means of the end cover members 12 and 14.

Openings 58 of identical configuration are formed in the discs 52, which openings, for purposes of the present disclosure, I shall term cylinders. Arranged within the cylinders are fluid pressure developing elements which I shall now describe. Secured to the input shaft 26, within the cylinders 58, are identical impeller members 60. Each impeller 60 has cylindrical sealing surfaces 62 and piston elements 64 which in the specific embodiment of my invention disclosed herein comprise three.

The countershafts 28 each have secured thereto, within each cylinder 58, an abutment valve member 66. Each valve 66 has a cylindrical sealing surface 68 and by-pass recesses 70. The recesses 70 permit the piston elements 64 to pass the valve members 66 without interference during operation of the pump. The cylindrical sealing surfaces 68 of the valves 66 are adapted to have rolling frictional contact with the cylindrical sealing surfaces 62 of the adjacent impellers 60. The aforenoted plates 54 and 56 form the sides of the pump cylinders 58 and also act as side seals for the impellers 60 and valve members 66.

The diameters of the sealing surfaces of the impellers 60 and valves 66 are identical so that no rubbing action will occur when they rotate against each other. The distances between the axis or center of the impeller 60 and the axes or centers of the valves 66 are equal to the seal diameter of the fluid pressure developing elements, while the distance between the axes or centers of the valves 66 is a few thousandths greater than the latter center distances so that the sealing surfaces 68 of the valves 66 do not touch and rub against each other.

From the above description, it will be realized that the axes of the impeller 60 and valves 66 are arranged at the corners or apexes of a substantially equilateral triangle. With this arrangement, if the aforedescribed gears 49 and 50 were formed with the same pitch diameters, they would be locked together and could not rotate. Consequently, to remedy this situation, the gears 50 are formed with identical pitch diameters that are less than the pitch diameter of the gear 49. In fabrication, the teeth of the gear 49 are cut in an oversized gear blank, while the teeth of the gears 50 are cut in undersized gear blanks, their outside diameters being the same as the diameter of the sealing surfaces 68 of the valves 66. The pitch diameter of the gear 49 is equal to the diameter of the sealing surfaces of the fluid pressure developing elements plus two times the gear tooth addendum, and the pitch diameters of the gears 50 are equal to the diameter of the sealing surfaces of the fluid pressure developing elements minus two times the gear tooth addendum. By using the same involute cutter or basic rack for cutting the teeth in the gears 49 and 50, identical numbers of teeth can be provided in each of the three gears.

Thus, since all three gears have identical numbers of teeth, the impeller and valves associated therewith will be resolved at identical speeds. Moreover, since, as shown in Figure 4, the gears 50 do not mesh with each other, the three gears are free to rotate even though their axes are arranged at the corners of a substantially equilateral triangle.

To provide for the introduction of fluid into the pump, an inlet fluid passageway or port 72, common to both cylinders 58, is formed in the casing 10, and the discs 52. Discharge of fluid from the cylinder 58 is effected through two individual outlet fluid passageways or ports 74 formed in the discs 52, the plates 56 and the casing 10. The piston elements 64, as may be observed in Figure 2, during rotation serve to move fluid from the inlet port 72 to the outlet ports 74. Also, as a piston element 64 leaves the area between the two valve members 66, a volume of fluid equal to the volume of the piston element is sucked from the inlet port 72 past the end of the piston element and the adjacent valve recess 70 into the area between the two valve members 66. Then, as the succeeding piston element 64 enters the area between the two valve members 66, a volume of fluid equal to the volume of the piston element is displaced from that area past the end of the piston element and the adjacent valve recess 70 into the associated outlet port 74. This last described pumping action adds to the flow generated by the main rotating piston action.

The valve members 66 are operable to prevent fluid from returning from the outlet ports 74 back to the inlet port 72. Within each cylinder 58, the valve members 66 alternately seal for sixty degree periods of rotation whereby return fluid flow is always blocked by one or the other of the valve members 66.

Since the impellers 60 and valves 66 are geared to rotate at the same velocity, no rubbing action can occur between these members when they are in sealing contact. Also, a slight clearance is provided between the ends of the piston elements 64 and the adjacent surfaces of the cylinders 58 of the discs 52 so as to prevent rubbing action therebetween. In view of the noted construction of the pump elements, rubbing action can occur only at the sides of the plates 54 and 56. However, at the latter rubbing surfaces spot recesses 76 are formed in the plates 54 and 56 so that fluid is conducted about the sides of the impellers 60 and valves 66 in exactly balanced areas. Lubrication of the rubbing surfaces is thus insured and the impellers and valves are prevented from being forced against one of the adjacent plates 54 or 56 by unequal fluid pressure surges. If the valve elements were permitted to be forced against one of the adjacent plates, considerable wear would occur at the dry rubbing surfaces.

By arranging the two outlet fluid passageways 74, two independent fluid circuits may be actuated by the pump and either or both used as selected by the operator. The pressures of the fluid in the two circuits may be dissimilar as the pressure in each circuit is related to the work done by the fluid emitted from that particular circuit. In this connection, attention is directed to the fact that the inlet and outlet fluid passageways 72 and 74 are precision machined, extend linearly in the same direction and are disposed to provide for a substantially direct line of flow of fluid through the pump which contributes to a high pumping efficiency.

During operation of the pump, fluid which leaks out of the cylinders 58 passes through the bearing assemblies 30 and 32 into fluid chambers 80 and 82 lying respectively between the cover members 12 and 14 and the discs 34. This leaking fluid will gather until it fills the chambers 80 and 82. Then a slight amount of the fluid will begin to leak past the running clearances maintained between the seal bushings 40 and 42 and the input shaft 26.

The pressure of the fluid leaking past the bearings 30 and 32 into the chambers 80 and 82 builds up until it becomes approximately the same as that of the fluid being pumped through the cylinders 58. This pressure serves to force the sandwiched discs 34 and 52 and plates 54 and 56 together, thereby preventing the pressure of the fluid within the cylinders 58 from expanding the sandwiched elements of the pump. Also, after the pump has been in operation for a short period of time, the fluid leaking past the bearing assemblies 30 and 32 will be reduced to that volume which can escape past the seals 40 and 42. As a result, high pumping efficiency is at all times maintained. So as to prevent rotary shifting of the discs 34 and 52 and the plates 54 and 56, and in order to equalize the pressure of the fluid within the chambers 80 and 82, a tubular dowel member 84 (which is shown rotated out of position in Figure 1) is disposed through the sandwiched discs and plates and projects into the end covers 12 and 14 in communication with the chambers 80 and 82.

The fluid which seeps past the seals 40 and 42 is collected in adjacent chambers 86 and 88 and returned to the inlet port 72 through fluid passageways 90 formed in the end covers 12 and 14 and the housing 10.

It should be apparent from the foregoing description that the use of tubular, plate and disc stock provides for an inexpensive, high-precision, rugged pump which is capable of developing high fluid pressures. Obviously, the capacity of the pump can be varied by changing the relative dimensions of the elements of the pump. The capacity of the pump likewise may be increased by lengthening the main housing 10 and assembling additional sets of impellers and valves within such lengthened housing. Similarly, the capacity of the pump may be decreased by eliminating one set of impellers and valves and shortening the housing 10.

The above described pump of my present invention is of the uni-directional type. As will be understood by those skilled in the art, if the elements of the pump are assembled in relation opposite to that shown in the drawings, the pump may be driven in the opposite direction. Also in this connection, the pump can be converted into a motor that may be driven in either direction simply by making the inlet and outlet ports of the same configuration.

Now, while I have shown and described what I believe to be a preferred embodiment of my present invention, it will be understood that various modifications and rearrangements may be made therein without departing from the spirit and scope of my invention.

I claim:

1. A fluid pump comprising a casing having a substantially cylindrical bore, a plurality of cylindrical fluid cylinder defining elements arranged in the bore of said casing transversely thereof, cover members secured to the ends of said casing for enclosing the latter and maintaining said cylinder elements in assembled relation, an input shaft extending through said cylinder defining elements and one of said cover members, fluid pressure developing elements driven by said input shaft within the cylinder defined by said cylinder defining elements, and substantially aligned inlet and outlet fluid passageway means in said cylinder defining elements in said casing to thereby provide a substantially direct line of flow of fluid through the pump.

2. A fluid pump comprising a casing having a substantially cylindrical bore, a plurality of cylindrical discs arranged in the bore of said casing transversely thereof, at least one of said discs having a fluid cylinder formed therein, cover members secured to the ends of said casing for enclosing the latter and maintaining said discs in assembled relation, an input shaft extending through said discs and one of said cover members parallel the axis of said casing, a pair of countershafts extending through said discs parallel to said input shaft, at least one impeller secured to said input shaft within said cylinder, at least one valve member secured to each of said countershafts within said cylinder, substantially aligned inlet and outlet fluid passageway means in said cylinder and said casing to provide a substantially direct flow of fluid through the pump, and said impellers and said valve members cooperating to increase the pressure of the fluid flowing from said inlet to said outlet fluid passageway means.

3. A fluid pump comprising a casing having a substantially cylindrical bore, a series of four cylindrical discs arranged in the bore of said casing transversely thereof, the intermediate discs of the series of discs having fluid cylinders formed therein, three plate members separating said discs, cover members secured to the ends of said casing for enclosing the latter and maintaining said discs and plates in assembled relation, an input shaft extending through said discs, said plates and one of said cover members parallel to the axis of said casing, a pair of countershafts extending through said discs and said plates parallel to said input shaft, said input shaft and said countershafts being journalled in the end discs of the series of discs, impellers secured to said input shaft within said cylinders, valve members secured to said countershafts within said cylinders, common inlet fluid passageway means in said casing directly communicating with said cylinders, separate outlet fluid passageway means in said casing directly communicating with each of said cylinders, said impellers and said valve members cooperating to increase the pressure of the fluid flowing from said inlet fluid passageway means to said outlet fluid passageway means, and the fluid pressure in each outlet fluid passageway means being related to the work done by the fluid being emitted from the particular outlet fluid passageway means.

4. A fluid pump comprising a casing having a cylindrical bore, a plurality of cylindrical discs arranged in the bore of said casing transversely thereof, at least one disc of the series of discs having a fluid cylinder formed therein, plate members separating said discs and serving as side seals for said cylinder, cover members secured to the ends of said casing for enclosing the latter and maintaining said discs and plates in asembled relation, an input shaft extending through said discs, said plates and one of said cover members parallel to the axis of said casing, said one disc having inlet and outlet fluid passageway means communicating with the fluid cylinder thereof inlet and outlet fluid passageway means in said casing communicating with said inlet and outlet fluid passageway means of said cylinder, and fluid pressure developing elements within said cylinder and driven by said input shaft for increasing the pressure of the fluid flowing from said inlet to said outlet fluid passageway means of said casing.

5. A fluid pump comprising a casing having a cylindrical bore, a series of four cylindrical discs arranged in the bore of said casing transversely thereof, the intermediate discs of the series of discs having fluid cylinders formed therein, three plate members separating said discs and serving as side seals for said cylinders, said discs and said plates extending transversely of the axis of said casing, cover members secured to the ends of said casing for enclosing the latter and maintaining said discs and plates in assembled relation, an input shaft extending through said discs, said plates and one of said cover members parallel to the axis of said casing, a pair of countershafts extending through said discs and said plates parallel to said input shaft, said input shaft and said countershafts being journaled in the end discs of the series of discs, impellers secured to said input shaft within said cylinders, valve members secured to said countershafts within said cylinders, inlet and outlet fluid passageway means in said casing and said intermediate discs communicating with said cylinders, and said impellers and said valve members cooperating to increase the pressure of the fluid flowing from said inlet to said outlet fluid passageway means.

6. A fluid pump comprising a casing having a cylindrical bore, a plurality of cylindrical discs arranged in the bore of said casing transversely thereof, at least one of the discs having a fluid cylinder formed therein, plate members separating said discs, said plate members having spot recesses formed in the surfaces thereof adjacent said cylinder, cover members secured to the ends of said casing for enclosing the latter and, with associated dowel means, maintaining said discs and plates in assembled relation, an input shaft extending through said discs, said plates and one of said cover members, a pair of countershafts extending through said discs and said plates, said input shaft and said countershafts being journaled in said discs, an impeller secured to said input shaft within said cylinder, a valve member secured to each of said countershafts within said cylinder, inlet and outlet fluid passageway means in said casing and said one disc communicating with said cylinder, said impeller and said valve members cooperating to increase the pressure of the fluid flowing from said inlet to said outlet fluid passageway means, and said recesses in said plate members serving to receive and conduct fluid into equal areas about both sides of the impeller and valve members so as to equalize the end pressures and lubricate the adjacent rubbing surfaces and prevent said impeller and valve members from being forced against one of the adjacent plates by unequal fluid pressure surges.

7. A fluid pump comprising a casing having a cylindrical bore, a plurality of cylindrical fluid cylinder defining elements arranged in the bore of said casing transversely thereof, cover members secured to the ends of said casing for enclosing the latter and, with associated dowel means, maintaining said cylinder defining elements in assembled relation, bearing journaling elements in said cylinder defining elements, an input shaft extending through said cylinder defining elements and one of said cover members parallel to the axis of said casing and journaled in said bearing journaling elements, fluid seals arranged about said input shaft and carried in axial bores in said end cover members opening inwardly of said casing, fluid pressure developing elements driven by said input shaft within said cylinder defining elements, inlet and outlet fluid passageway means communicating with said cylinder defining elements, and said end cover members and said bearing journaling elements defining chambers inwardly of said input shaft seals whereat fluid leaking from said cylinder defining elements may collect and build up in pressure to approximately the pressure of the fluid being pumped by said fluid pressure developing elements whereby said elements are forced toward each other and the pressure of the fluid being pumped by said fluid pressure developing elements is prevented from separating said cylinder defining elements.

8. A fluid pump comprising a casing having a cylindrical bore, a plurality of cylindrical fluid cylinder defining elements arranged in the bore of said casing transversely thereof, cover members secured to the ends of said casing for enclosing the latter and, with associated dowel means, maintaining said cylinder defining elements in assembled relation, bearing journaling elements in said cylinder defining elements, an input shaft extending through said cylinder defining elements and one of said cover members parallel to the axis of said casing and journaled in said bearing journaling elements, fluid seals arranged about said input shaft and carried in axial bores in said end cover members opening inwardly of said casing, fluid pressure developing elements driven by said input shaft within said cylinder defining elements, inlet and outlet fluid passageway means communicating with said cylinder defining elements, said end cover members and said bearing journaling elements defining first chambers inwardly of said input shaft seals whereat fluid leaking from said cylinder defining elements may collect and build up in pressure to approximately the pressure of the fluid being pumped by said fluid pressure developing elements whereby said cylinder defining elements are forced toward each other and the pressure of the fluid being pumped by said fluid pressure developing elements is prevented from separating said cylinder defining elements, second chambers formed in said cover members outwardly of said input shaft seals whereat fluid leaking from said first chambers past said input shaft seals may collect, and fluid passageway means in said cover members communicating with said second chambers for returning the fluid collected in the latter to said input fluid passageway means.

9. A fluid pump comprising a casing having a cylindrical bore, a plurality of cylindrical discs arranged in the bore of said casing transversely thereof, cover members secured to the ends of said casing for enclosing the latter and, with associated dowel means, maintaining said discs in assembled relation, an input shaft extending through said discs and one of said cover members, said input shaft being journaled in said discs, fluid seals arranged about said input shaft and carried in axial bores in said end cover members opening inwardly of said casing, at least one disc of the plurality of discs having a fluid cylinder formed therein, an impeller secured to said input shaft within said cylinder, inlet and outlet fluid passageway means communicating with said cylinder, means within said casing for cooperation with said impellers to increase the pressure of the fluid flowing from said inlet to said outlet fluid passageway means, and said end cover members having chambers formed therein inwardly of said input shaft seals whereat fluid leaking from said discs may collect and build up in pressure to approximately the pressure of the fluid being pumped by said impellers whereby said discs are forced toward each other and the pressure of the fluid being pumped by the impellers is prevented from separating said discs.

10. A fluid pump comprising a casing having a cylindrical bore, a plurality of cylindrical discs arranged in the bore of said casing transversely thereof, cover members secured to the ends of said casing for enclosing the latter and maintaining said discs in assembled relation, an input shaft extending through said discs and one of said cover members, said input shaft being journaled in said discs, fluid seals arranged about said input shaft and carried in axial bores in said end cover members opening inwardly of said casing, at least one disc of the series of discs having a fluid cylinder formed therein, an impeller secured to said input shaft within said cylinder, inlet and outlet fluid passageway means communicating with said cylinder, means within said casing for cooperation with said impeller to increase the pressure of the fluid flowing from said inlet to said outlet fluid passageway means, said end cover members having first chambers formed therein inwardly of said input shaft seals whereat fluid leaking from said discs may collect and build up on pressure to approximately the pressure of the fluid being pumped by said impellers whereby said discs are forced toward each other and the pressure of the fluid being pumped by the impellers is prevented from separating said discs, said end cover members having second chambers formed therein outwardly of said input shaft seals whereat fluid leaking from said first chambers past said input shaft seals may collect, and fluid passageway means in said cover members for returning the fluid collected in said second chambers to said input fluid passageway means.

11. A fluid pump comprising a casing having a cylindrical bore, a series of four cylindrical discs arranged in the bore of said casing, three plate members separating said discs, said discs and said plates extending transversely of the axis of said casing, cover members secured to the ends of said casing for enclosing the latter and, with associated dowel means, maintaining said discs and plates in assembled relation, an input shaft extending through said discs, said plates and one of said cover members parallel to the axis of said casing, a pair of countershafts extending through said discs and said plates parallel to said input shaft, said input shaft and said countershafts being journaled in the end discs of the series of discs, fluid seals arranged about said input shaft and carried in axial bores in said end cover members opening inwardly of said casing, the intermediate discs of the series of discs having fluid cylinders formed therein, impellers secured to said input shaft within said cylinders, valve members secured to said countershafts within said cylinders, inlet and outlet fluid passageway means communicating with said cylinders, said impellers and said valve members cooperating to increase the pressure of the fluid flowing from said inlet to said outlet fluid passageway means, and said end cover members having chambers formed therein inwardly of said input shaft seals whereat fluid leaking from said discs and plates may collect and build up in pressure to approximately the pressure of the fluid being pumped by said impellers whereby said discs and plates are forced together and the pressure of the fluid being pumped by the impellers is prevented from separating said discs and plates.

12. The combination of claim 11 wherein the dowel means disposed through said discs and plate members is tubular and is in communication with said chambers for equalizing the pressure of the fluid in the latter.

13. A fluid pump comprising a tubular casing having a cylindrical bore, a series of four cylindrical discs arranged in the bore of said casing, three plate members separating said discs, said discs and said plates extending transversely of the axis of said casing, cover members secured to the ends of said casing for enclosing the latter and, with associated dowel means, maintaining said discs and plates in assembled relation, an input shaft extending through said discs, said plates and one of said cover members parallel to the axis of said casing, a pair of countershafts extending through said discs and said plates parallel to said input shaft, said input shaft and said countershafts being journaled in the end discs of the series of discs, fluid seals arranged about said input shaft and carried in axial bores in said end cover members opening inwardly of said casing, the intermediate discs of the series of discs having fluid cylinders formed therein, impellers secured to said input shaft within said cylinders, valve members secured to said countershafts within said cylinders, means for synchronizing rotation of said input and countershafts whereby said impellers and said valve members are rotated at the same speed, inlet and outlet fluid passageway means communicating with said cylinders, said impellers and said valve members cooperating to increase the pressure of the fluid flowing from said inlet to said outlet fluid passageway means, said end cover members having first chambers formed therein inwardly of said input shaft seals whereat fluid leaking from said discs and plates may collect and build up in pressure to approximately the pressure of the fluid being pumped by said impellers whereby said discs and plates are forced together and the pressure of the fluid being pumped by the impellers is prevented from separating said discs and plates, said end cover members having second chambers formed therein outwardly of said input shaft seals whereat fluid leaking from said first chambers past said input shaft seals may collect, and fluid passageway means in said cover members for returning the fluid collected in said second chambers to said input fluid passageway means.

14. A fluid pump comprising a casing, three fluid pressure developing elements having sealing surfaces of identical diameters arranged in said casing with their axes at the apexes of a substantially equilateral triangle, three gears disposed in said casing and formed with identical numbers of teeth, said gears being aranged coaxial of said three fluid pressure developing elements, one of said gears meshing with the other two gears, said two gears being out of mesh with each other and in which said two gears are of the same pitch diameter but less than the pitch diameter of said one gear whereby said fluid pressure developing elements are rotatable at identical speeds.

15. A fluid pump comprising a casing, a drive shaft and a pair of countershafts journaled for rotation in said casing, at least one impeller secured to said drive shaft and a pair of valve members one secured to each of said countershafts, said impeller and valve members having sealing surfaces of identical diameters the axes of said impeller and said valve members being arranged at the apexes of a substantially equilateral triangle, a drive gear secured to said drive shaft, a driven gear secured to each of said countershafts, said gears having identical numbers of teeth, said drive gear being formed oversize relative to said driven gears, said driven gears meshing with said drive gear but not with each other and in which said driven gears are of the same pitch diameter but less than the pitch diameter of said drive gear whereby said impeller and said valve members are rotatable at identical speeds.

16. A fluid pump comprising a casing, a drive shaft and a pair of countershafts journaled for rotation in said casing, fluid pressure developing elements comprising at least one impeller secured to said drive shaft and one cooperating valve member secured to each of said countershafts, said impeller and valve members having sealing surfaces of identical diameters, the axes of said valve members being spaced from the axis of said impeller a distance equal to the seal diameter of said fluid pressure developing elements and the axes of said valve members being spaced from each other a distance equal to the seal diameter of said fluid pressure developing elements plus a few thousandths of an inch whereby said valve members are in rolling sealing contact with said impeller but are spaced slightly from each other, a drive gear secured to said drive shaft, a driven gear secured to each of said countershafts, said gears having identical numbers of involute system gear teeth, and said drive gear being formed with a pitch diameter equal to the seal diameter of said fluid pressure developing elements plus two times the gear tooth addendum and said driven gears each being formed with a pitch diameter equal to the seal diameter of said fluid pressure developing elements minus two times the gear tooth addendum so that said driven gears are of the same pitch diameter but less than the pitch diameter of said drive gear whereby said driven gears are meshable with said drive gear but not with each other and said impeller and said valve members are rotatable at identical speeds.

(References on following page)

References Cited in the file of this patent

UNITED STATES PATENTS

| | | |
|---|---|---|
| 912,549 | Fagan | Feb. 16, 1909 |
| 1,157,783 | Keene | Oct. 26, 1915 |
| 1,597,411 | Kinney | Aug. 24, 1926 |
| 1,648,092 | Whiting | Nov. 8, 1927 |
| 1,771,863 | Schmidt | July 29, 1930 |
| 1,976,761 | Barels | Oct. 16, 1934 |
| 2,390,880 | Harrold | Dec. 11, 1945 |
| 2,525,619 | Roth et al. | Oct. 10, 1950 |
| 2,694,978 | Berry | Nov. 23, 1954 |
| 2,697,912 | Berry | Dec. 28, 1954 |